United States Patent [19]
Costales et al.

[11] Patent Number: 6,044,395
[45] Date of Patent: Mar. 28, 2000

[54] METHOD AND APPARATUS FOR DISTRIBUTING PERSONALIZED E-MAIL

[75] Inventors: Bryan Costales, Laramie, Wyo.; Ben Davenport, Charlotte, N.C.; John T. Funk, Golden, Colo.; Russ Martin, Purcellville, Va.

[73] Assignee: Exactis.Com, Inc., Denver, Colo.

[21] Appl. No.: 08/922,353

[22] Filed: Sep. 3, 1997

[51] Int. Cl.[7] ............................. G06F 13/38; G06F 15/17
[52] U.S. Cl. ..................... 709/206; 709/207; 709/200; 707/10; 395/683; 379/93.24
[58] Field of Search ................... 709/200, 206, 709/207; 395/683; 379/93.24; 707/10

[56] References Cited

U.S. PATENT DOCUMENTS

| | | | |
|---|---|---|---|
| 5,113,393 | 5/1992 | Kam et al. ............................. | 370/94.1 |
| 5,339,156 | 8/1994 | Ishii ....................................... | 358/402 |
| 5,493,692 | 2/1996 | Theimer et al. . | |
| 5,508,817 | 4/1996 | Kunigami ............................... | 358/402 |
| 5,530,739 | 6/1996 | Okada et al. .......................... | 358/402 |
| 5,559,721 | 9/1996 | Ishii ....................................... | 358/402 |
| 5,768,505 | 6/1998 | Gilchrist et al. ....................... | 709/201 |
| 5,794,039 | 8/1998 | Guck ..................................... | 395/683 |
| 5,893,099 | 4/1999 | Schreiber et al. ...................... | 707/10 |
| 5,903,723 | 5/1999 | Beck et al. ............................. | 700/200 |

OTHER PUBLICATIONS

Douglas E. Comer, Internetworking with TCP/IP, pp. 440–442, 1995.
Gilchrist et al., Object Oriented Mail Server Framework Mechanism, U.S. Patent No. 5,768,505, 1998.
Morgenstern, "Farcast Service Broadcasts Instant Info Via the Internet; Databases Use 'Droids' to Process News Items," PCWEEK, Aug. 29, 1994, vol. 11, No. 34, p. 50(1).
Krol, "The Whole Internet User's Guide & Catalog," 1994, pp. 104–148.
"Internet For Scientists & Engineers," 1995, pp. 57–70.

*Primary Examiner*—Frank J. Asta
*Assistant Examiner*—Mahmanzar Moezzi
*Attorney, Agent, or Firm*—Finnegan, Henderson, Farabow, Garrett, & Dunner, L.L.P.

[57] ABSTRACT

Information common to multiple e-mail messages (called common content "chunks") is separated from the individual e-mail messages before transmission. The chunks are then transmitted separately from the individual e-mail message information, and reassembled into a complete e-mail message at the receiving site.

23 Claims, 5 Drawing Sheets

102 — DATE: SAT, 27 MAY 97 13:00:00 EDT
100 — FROM: JON@INFOBEAT.COM
     TO: BRYAN@BRI.COM
101 — SUBJECT: MEETING

105 — BRYAN, LET'S GET TOGETHER MONDAY AT 1PM. JON

FIG. 1A

110
112 — S: HELO INFOBEAT.COM
113 — R: 250 BRI.COM -- HELLO, INFOBEAT.COM
114 — S: MAIL FROM <JON@INFOBEAT.COM>
115 — R: 250 MAIL ACCEPTED
116 — S: RCPT TO: <BRYAN@BRI.COM>
117 — R: 250 RECIPIENT ACCEPTED
118 — S: DATA
119 — R: 354 START MAIL INPUT; END WITH <CRLF> . <CRLF>
120 — S: DATE: SAT, 27 MAY 97 13:00:00 EDT
121 — S: FROM: JON@INFOBEAT.COM
122 — S: TO: BRYAN@BRI.COM
123 — S: SUBJECT: MEETING
124 — S:
       S: BRYAN, LET'S GET TOGETHER MONDAY AT 1PM. JON
125 — S: .
126 — R: 250 OK
127 — S: QUIT
128 — R: BRI.COM CLOSING SPACE CONNECTION

FIG. 1B

501 — S: MAIL FROM: <JON@INFOBEAT.COM>
502 — R: 250 JON@INFOBEAT.COM... SENDER OK
503 — S: MESG TO: <BRYAN@BRI.COM>
    — R: 354 ENTER MAIL, END WITH "." ON A LINE BY ITSELF

505 — S: TO: BRYAN@BRI.COM
      S: FROM: JON@INFOBEAT.COM
      S: SUBJECT: THIS IS A TEST

506 — S:

507 — S: HELLO.
      S:

S= SENDING COMPUTER (CLIENT)
R= RECEIVING COMPUTER (SERVER)

509 — S: %11
      S: %12
      S: %11 %11

S:
507 — S: SINCERELY,
      S: JON

508 — S:
510 — R: 250 MESSAGE ACCEPTED FOR DELIVERY

*FIG. 5A*

TO: BRYAN@BRI.COM
FROM: JON@INFOBEAT.COM
SUBJECT: THIS IS A TEST

HELLO.

THIS IS THE FIRST LINE OF CONTENT.
FIRST LINE OF A TWO-LINE CHUNK.
SECOND LINE OF A TWO-LINE CHUNK.
THIS IS THE FIRST LINE OF CONTENT. THIS IS THE FIRST LINE
OF CONTENT.

SINCERELY,
JON

*FIG. 5B*

METHOD AND APPARATUS FOR DISTRIBUTING PERSONALIZED E-MAIL

FIELD OF THE INVENTION

The present invention relates to electronic mail, and more particularly, to high volume electronic mail delivery systems and methods.

DESCRIPTION OF THE RELATED ART

Electronic mail ("e-mail") is quickly becoming a standard mode of communication in the 1990s. E-mail's popularity can be attributed to the ease with which e-mail messages may be transmitted, and the speed with which a transmitted message arrives at the intended destination. For example, to transmit a single e-mail message, the sender typically types a message and addresses the message with the recipient's e-mail address. When the message is complete, the sender commands the e-mail software to transmit the message, and the message is then delivered over a computer network such as the Internet. The delivered message is quickly received by the recipient's computer—often within seconds.

Before two computers can exchange e-mail with one another, they must agree on a common set of rules or agreements describing how they are to communicate. These rules are collectively referred to as a protocol. One conventional e-mail exchange protocol, which is widely used between computers exchanging e-mail over the Internet, is SMTP ("simple mail transfer protocol"). SMTP prescribes the series of commands computers exchanging e-mail are to use when communicating with one another.

Communication between two computers sending an exemplary e-mail message using the SMTP protocol will be discussed with reference to FIGS. 1A and 1B. The message to be sent is shown in FIG. 1A. The message comprises content or body information 105 and header information 100, which includes an address 101 that the e-mail is to be delivered to ("bryan@bri.com") and an address 102 of the sender ("jon@infobeat.com"). The information following the "@" symbols in the addresses 101 and 102 define a domain, which may refer to a specific computer or a network of computers. In this example, we will assume that "infobeat.com" is a computer trying to send e-mail to the computer "bri.com."

FIG. 1B illustrates a typical conversation between the sending, or client, computer "infobeat.com" (labeled "S") and the receiving computer "bri.com" (labeled "R") using the SMTP protocol. After an initial connection has been established, the sending computer sends a HELO command identifying itself to the receiving computer and letting the receiving computer know it would like to send an e-mail message using the SMTP protocol (line 110). The receiving computer responds with the numeric code 250 (line 112), indicating it has received and accepted the sending computers request for a SMTP mail session- In response, the sending computer issues a series of commands indicating the sender's address (lines 113), the recipient's address (line 115), and the start of actual text of the message (line 117). The receiving computer acknowledges each command with an appropriate acknowledgment code (lines 114, 116, 118). The actual text of the message is sent in lines 119–124. Under SMTP, the end of the message text is indicated by a line consisting of a period (line 125). Finally, the receiving computer acknowledges that the text of the message has been received (line 126). The sending computer closes the communication channel (line 127) and the receiving computer accepts responsibility (line 128).

SMTP, as discussed above, is a protocol for sending a single e-mail message between two computer programs. SMTP was designed to send person-to-person e-mail, which is e-mail sent from one sender to one recipient, and broadcast e-mail, which is a single message sent from one person to many recipients.

Recently, the appearance of advertising and profile-driven e-mail has caused a third form of e-mail to emerge: personalized e-mail. Personalized e-mail is similar to broadcast e-mail in that it is a one-to-many mailing. It is similar to person-to-person e-mail in that each message body contains text specific to each recipient. Personalized e-mail differs from these two traditional forms of e-mail in that a portion of the message body for any given recipient is identical for all the recipients (as in broadcast e-mail), but other portion(s) of the message body are unique for each recipient (similar to person-to-person e-mail).

The SMTP protocol and other conventional e-mail protocols are limited in their ability to efficiently send high volume personalized e-mail. For each personalized e-mail to be sent, a system following the SMTP protocol pre-creates and individually sends each personalized e-mail message. Pre-creating such personalized messages prior to transmission requires large local disk storage and wastes network bandwidth during transmission. Accordingly, high volume personalized e-mail transmissions tend to burden available computing resources.

Thus, there is a need for an e-mail transmission protocol and method that provides the capability to efficiently transmit a large number of personalized e-mail messages.

SUMMARY OF THE INVENTION

Information common to multiple e-mail messages is sent as common content chunks, which may be transmitted only once each, but merged into many different e-mail messages at the final destination.

The advantages and purposes in accordance with the invention will be set forth in the following description and will also be obvious from the description, or may be learned by practicing the invention. The advantages and purposes of the invention will be realized and attained by means of the elements and combinations particularly pointed out in the appended claims.

To obtain the advantages, and in accordance with the purposes of the invention, as embodied and broadly described herein, one aspect of the present invention includes a method of sending an e-mail message from a first computer to a second computer via a network, comprising the steps of (1) transmitting a first portion of the e-mail message to the second computer over the network, the first portion containing at least one block of text, each of the blocks of text being assigned a different index value; and (2) transmitting a second portion of the e-mail message to the second computer over the network, the second portion containing information specific to a particular recipient and containing pointers to the index values. The first and second portions together include information sufficient to form the complete e-mail message for the particular recipient.

Alternate aspects of the present invention include a method of receiving e-mail messages, a computer readable medium including instructions for implementing the present invention, and a computer system for implementing the present invention.

Both the foregoing general description and the following detailed description are exemplary and explanatory only and do not restrict the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings, FIG. 1A is a listing of an exemplary e-mail message;

FIG. 1B is a listing of an exemplary e-mail transaction using the SMTP protocol;

FIG. 5A is a listing of a portion of an exemplary MMTP transaction including MAIL and MESG command sequences; and FIG. 5B is a listing showing the final, substituted version of the e-mail message in FIG. 5A applied to the CONT sequence shown in FIG. 4.

DETAILED DESCRIPTION

Consistent with an embodiment of the present invention, information common to multiple e-mail messages (called common content "chunks") is separated from the individual e-mail messages before transmission. The chunks are then transmitted separately from the individual e-mail message information and reassembled into a complete e-mail message at the receiving site.

Reference will now be made in detail to the embodiments of the invention, examples of which are illustrated in the accompanying drawings. Wherever possible, the same reference numbers will be used throughout the drawings to refer to the same or like part.

Figure 2:
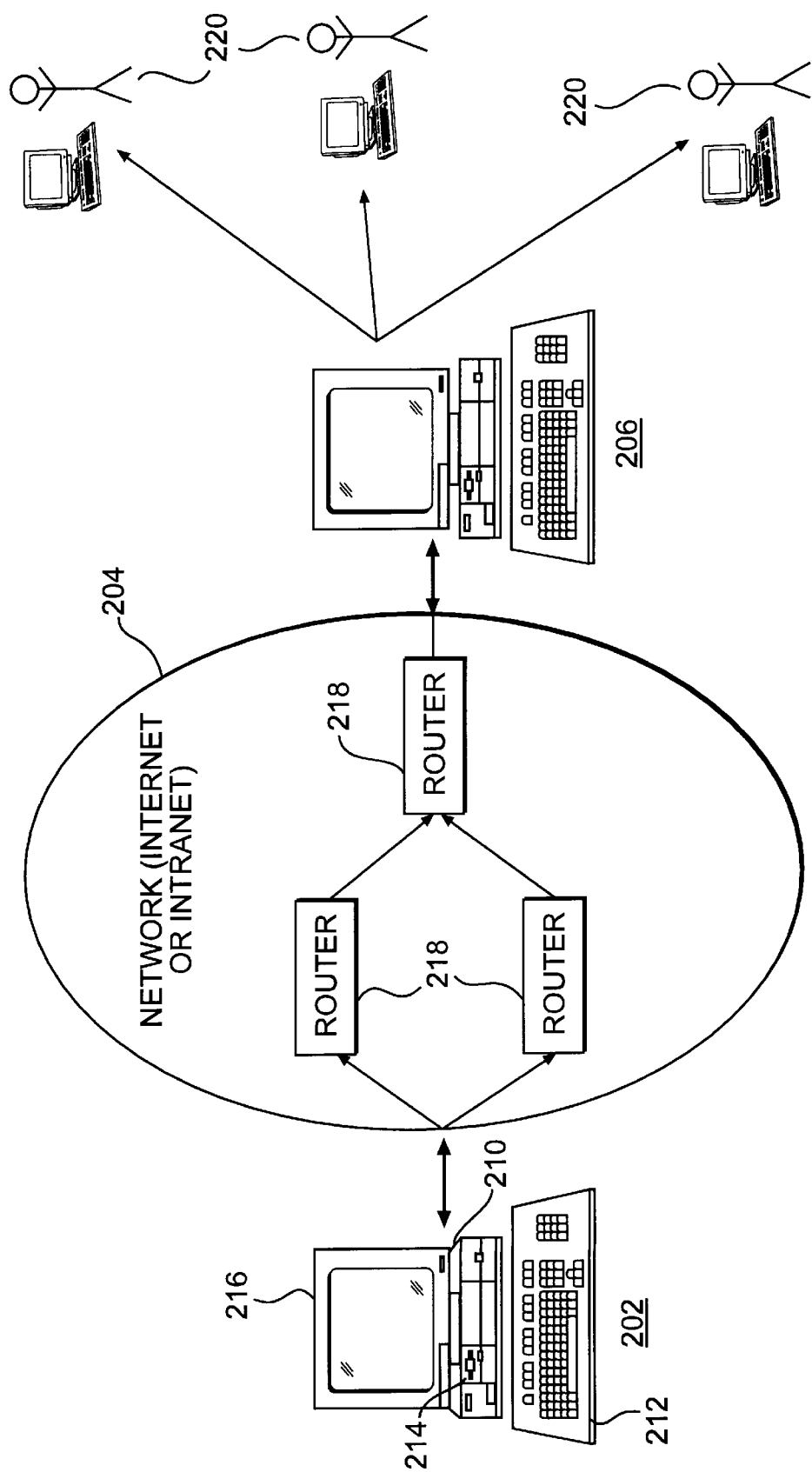
FIG. 2 is a block diagram of an exemplary computing system on which an e-mail system according to the present invention may be implemented.

FIG. 2 is a block diagram of an exemplary computing system on which an e-mail message system consistent with the present invention may be implemented. The system includes a client computer system 202 (i.e., the sending computer) connected to a network 204, such as the Internet or a corporate intranet. As shown, client computer system 202 includes a chassis 210, which holds the computer's main processor and main memory; an input device such as keyboard 212; a storage device such as floppy or hard disk drive 214; and a display such as monitor 216. Although client computer 202 is pictured as a simple PC connected to a network, it may be any type of computer or network of computers capable of sending e-mail. In particular, in a system intended for extremely high volume e-mail traffic, client computer system 202 may be a specialized high volume e-mail processing system such as that described in U.S. patent application Ser. No. 08/710,964, filed on Sep. 24, 1996, by John Funk et al.

Network 204 includes routers 218 for forwarding information through network 204 to server 206 (the receiving computer). Server 206 includes components identical to those of client computer 202. Alternatively, as with client computer system 202, server 206 may be one of many types of well known computer systems or networks of computer systems. Server 206 may receive mail for multiple end-users 220.

Although client computer 202 and server computer 206 are illustrated as stand alone computers, they may, of course, be implemented as a more complex computer or a network of computers. For example, client computer 202 may be a network of computers that generates, or builds, a large number of e-mail messages and saves these e-mail messages as a file. The file may then be transmitted using the method of the present invention (described below) over intranet 204 and received by server computer 206. Server computer 206 may then transmit the e-mail messages to end-users 220 directly or via an e-mail protocol such as SMTP or MMTP (described below).

Figure 3:
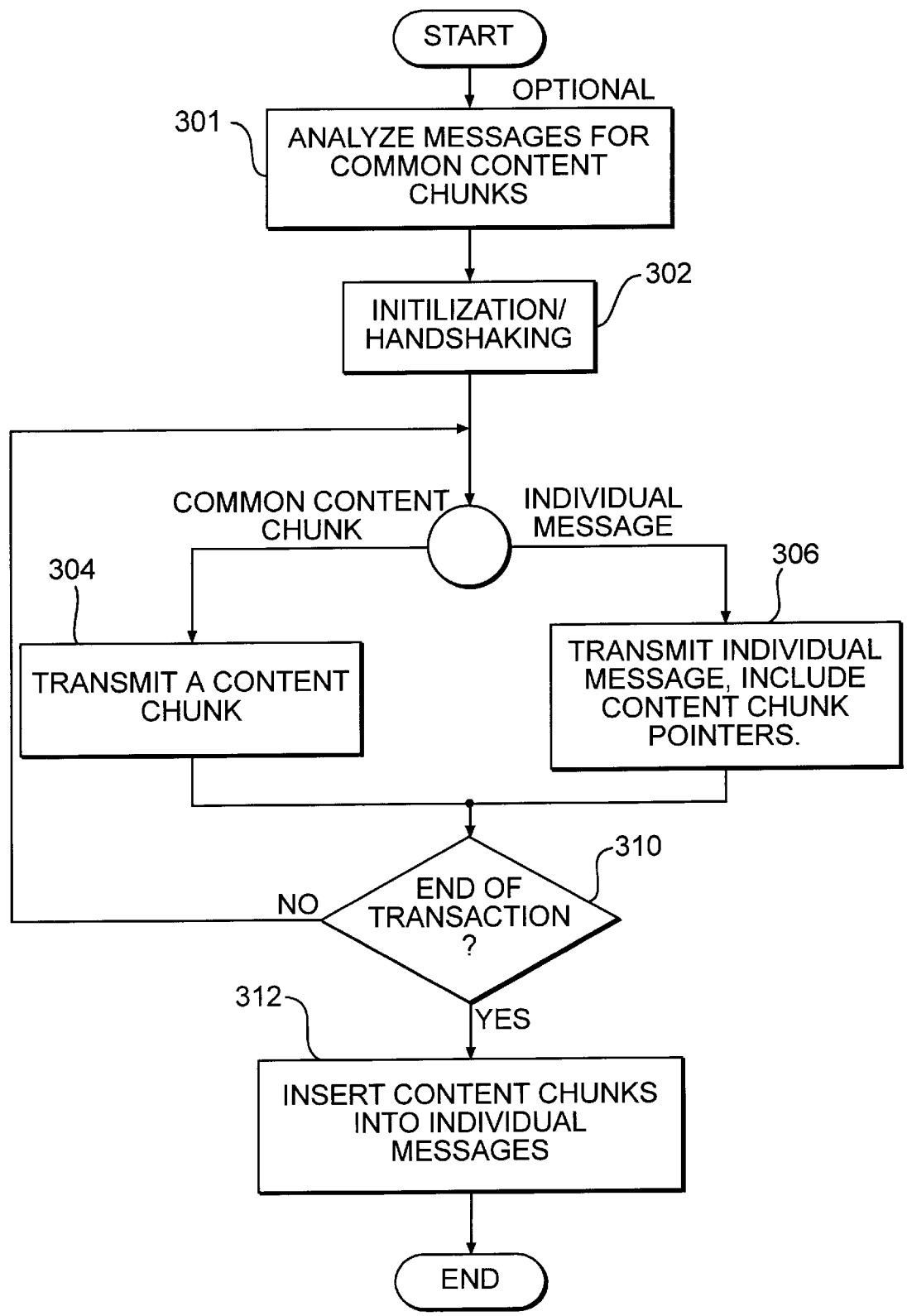
FIG. 3 is a flow chart illustrating the general method of an e-mail system according to the present invention.

FIG. 3 is a flow chart illustrating the general method of an e-mail communication system consistent with one embodiment of the present invention. Initially, the client system may analyze a group of messages and determine if the messages are conducive to transmission using the concepts of the present invention (optional step 301). Specifically, if a group of e-mail messages are addressed to a common host and if there is redundant or common information in the group of e-mail messages, they are likely candidates for the method of the present invention. Step 301 is optional because in many situations, such as when sending advertisement type personalized e-mail, the common content chunks are known a priori; thus separate analysis is not necessary.

The client begins transmission by opening a communication channel with the host system and exchanging initial handshaking, protocol and authentication information with the host (step 302). If the initialization is successful, the client transmits either a common content chunk (step 304) or an individual e-mail message (step 306). The individual e-mail message transmitted in step 306 contains most or all of the information transmitted with conventional e-mail messages, including, for example, the sender's e-mail address, the recipient's e-mail address, and text written specifically for the individual recipient. Additionally, the individual e-mail messages may contain pointers referencing the content chunks. Steps 304 and 306 are repeated for each content chunk or message until the transaction has ended (step 310). In this manner, the client may send multiple messages, each referencing a content chunk that is transmitted only once. Based on the pointers, the server inserts the appropriate content chunks into the individual messages, thereby creating the complete e-mail message (step 312).

The present invention is preferably implemented by computers such as those shown in FIG. 2, communicating through a high-level, point-to-point protocol called the Merge Mail Transfer Protocol (MMTP), which uses similar commands and identical error codes to SMTP and is preferably implemented with the TCP/IP family of lower level protocols. A server using MMTP may also handle SMTP e-mail requests.

Under MMTP, a client establishes a two-way transmission channel to an MMTP server. MMTP commands are generated by the MMTP client and sent to the MMTP server. MMTP replies are sent from the MMTP server to the MMTP client in response to the commands. Once the transmission channel is established and initial handshaking and authentication completed, the MMTP client initiates a mail transaction, which, in essence, consists of a series of CONT commands that send the common content chunks, and a series of AIL and MESG commands that send the individual e-mail messages. The CONT, MAIL, and MESG commands will now each be discussed in detail.

CONT COMMAND (syntax: CONT<CRLF>)

The CONT command is an optional command issued by the client, and specifies to the server that a content chunk is to be sent. If the server accepts the CONT command, it responds with reply code 354. The lines following the 354 code (where a line is defined as a string terminated by a <CRLF> sequence) define the content chunk. The content chunk is terminated by an end-of-data identifier, which is preferably a period on a line by itself (i.e., <CRLF><CRLF>).

A separate CONT command must be issued for each content chunk, and each successive content chunk sent by the client is assigned a successive positive integer, beginning with the number one, as an index or reference value. Likewise, each successive content chunk received by the host is assigned the same index value. The index values are used in the MESG command to reference appropriate content chunks. Although the index values are preferably successive positive integers, they may alternatively be defined as any appropriate symbol used to identify the content chunks.

Figure 4:
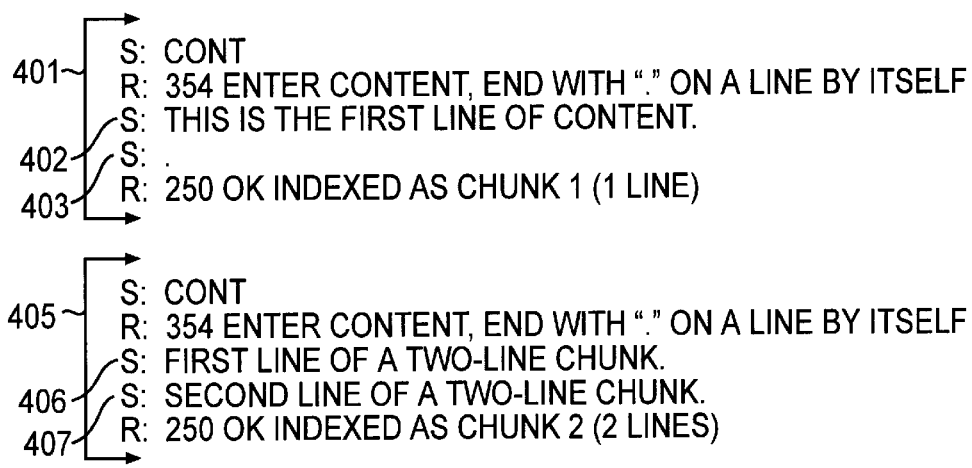
FIG. 4 is a listing of an exemplary CONT command sequence according to the MMTP protocol.

FIG. 4 illustrates two exemplary CONT command sequences. As shown in the first CONT sequence, sequence 401, the client initiates the CONT command, and the server responds with reply code 354 (intermediate ok). Alternate reply codes, other than reply code 354, such as an error reply code, are possible. Table I, below, lists preferred acceptable reply codes for the various MMTP commands. Reception of an error reply code indicates that the client is to revert to its state prior to sending the CONT command.

The first and only line of the content chunk in sequence 401 is on line 402. The period on line 403 indicates the end of the content chunk. The host acknowledges the end of the CONT sequence by sending reply code 250.

If CONT sequence 401 was the first CONT command issued in a MMTP transaction, the content chunk consisting of line 402 would be assigned the index number 1. CONT sequence 405, which consists of two content lines, 406 and 407, would then be assigned an index value of 2.

MAIL COMMAND (syntax: MAIL FROM: <reverse path>)

The MAIL command specifies the originator, or envelope sender, for the message specified by the immediately following MESG command (described below). This command has the same meaning and syntax as the SMTP MAIL command. If the host accepts the MAIL command, it returns a 250 OK reply and places the reverse path argument in a buffer.

A MAIL command followed immediately by another MAIL command is an acceptable MMTP operation. In this situation, the buffer with the reverse-path argument is simply overwritten. However, if the second MAIL command results in an error, the buffer is cleared.

MESG COMMAND (syntax: MESG TO: <forward path>)

This command identifies an individual recipient of a message and contains the message itself, including pointers to the content chunk indices. A MESG command must follow a MAIL command.

If the host accepts the MESG command, it returns a 354 reply code (intermediate ok). The message information follows the 354 reply code, and as in the CONT command, the message information is terminated by a period on a line by itself. The format of the message information following the MESG command is similar to the format of the SMTP DATA command That is, zero or more headers are given first, followed by a single blank line. If no headers are given, the blank line is optional. The headers are followed by the message body content. Unlike the DATA command, however, the MESG command may include pointers to content chunks.

FIG. 5A illustrates a portion of an exemplary MMTP transaction including MAIL and MESG command sequences. The MAIL command in line 501 indicates that the particular e-mail message is from "jon@infobeat.com." The server, after accepting the MAIL command, responds with a 250 reply code (line 502), and the client issues the MESG command, indicating in its argument that "bryan@bri.com." is the e-mail recipient (line 503). Subsequently, the server sends a 354 reply code, and the client begins to transmit the body of the e-mail message. The body of the e-mail message includes header information (section 505), a blank line (line 506), the true "body," or text of the individual message (sections 507), and content chunk pointer information (section 509). An end-of-data identifier (line 508) and a reply code (line 510) conclude the e-mail message.

The content chunk pointer information, such as that shown in section 509, is preferably identified in MMTP by a "%" sign followed by a single numerical digit ([0–9]). The single digit indicates the number of characters included in the pointer, with zero representing ten. The characters following the initial digit define an ASCII base ten integer representation of the index value of the desired content chunk. If a "%" character is intended to be inserted into the message body, it must be "escaped" by using a double percent ("%%"). If a "%" is encountered that is not followed by another "%" or a digit, or if the index value is invalid, the result is undefined.

The following examples illustrate content substitution.
GIVEN THAT:

content chunk with index of 1 is 'XXX' content chunk with index of 2 is 'OOO' content chunk with index of 3 is 'XXX/nOOO'
THEN:

| | |
|---|---|
| %11xxx | yields XXXxxx |
| %5 1xxx | yields XXXxxx |
| %11%12 | yields XXXOOO |
| %%11 | yields %11 |
| %%%11 | yields %XXX |
| %%a | yields %a |
| %13xxx | yields XXX\nOOOxxx |

FIG. 5B is a listing showing the final, substituted version of the e-mail message in FIG. 5A applied to the CONT sequence shown in FIG. 4. As shown, a first portion of the e-mail message, the common content chunks, have been substituted into a second portion of the e-mail message, the MESG information, to obtain the complete e-mail message.

In addition to the CONT, MESG, and MAIL commands, MMTP includes a number of other commands. A description of some of these commands follows.

MELO COMMAND (syntax: MELO <host name of client>)

This command starts the MMTP session and identifies the MMTP client to the MMTP server. The argument field contains the host name of the MMTP client. If the server is capable of handling the MMTP protocol, it returns a 250 reply code, confirming that both the MMTP client and server are ready to send an e-mail using the MMTP protocol.

The following example illustrates a MELO command establishing a connection between the client and server.

R: 220 server.infobeat.com MMTP qqd 1.0

S: MELO client.infobeat.com

R: 250 server.infobeat.com

QUIT COMMAND (syntax: QUIT)

When the client wishes to close the transaction, it sends the QUIT command. The server responds with a 221 reply code and closes the channel. If the connection is closed prematurely due to, for example, a network failure, the server acts as if the QUIT command has been received (canceling any pending message transaction, but not undoing any previously completed message transaction) and the client acts as if the command or transaction in progress has received a temporary error.

HELP COMMAND (syntax: HELP <sp> <string>)

This command causes the receiver to send helpful information to the sender. The command may take an argument (e.g., any command name) and return more specific information as a response.

The HELP command has no effect on any server buffers or state tables.

NULL OPERATION COMMAND (syntax: NOOP)

This command causes the receiver to send a 250 reply code on success. The following is an example of a NOOP command:

S: NOOP

R: 250 OK

Restrictions on Order of MMTP Commands

Restrictions on the preferred order in which the MMTP commands may be issued will now be described.

A MMTP session is initiated by a single MELO command. If a second MELO command is received by the server while the first MMTP session is still active, the server preferably issues an error and maintains its current state. If the MELO command is not acceptable to the MMTP server, a 500, 501, 502, or 550 error reply should be returned. The MMTP server stays in the same state after transmitting the error reply codes as it was in before the MELO command was received. Preferably, MELO should not be rejected because the client's putative name does not match some criteria established by the server (e.g. verification of reverse DNS mapping).

The NOOP and HELP commands may be used at any time during a session, or even without previously initializing a session. MMTP servers should process these commands normally even if no MELO command has yet been received; although clients should preferably open a session with MELO before sending these commands.

A mail transaction consists of zero or one CONT commands, followed by one or more pairs of MAIL and MESG commands. A mail transaction may be aborted by the QUIT command, however, any messages accepted for delivery by the server to that point may not be recalled. There may be zero or one mail transactions in an MMTP session.

If the MAIL command argument is not acceptable, a 501 failure should be returned and the MMTP server should stay in the same state. If the commands in a transaction are out of order to the degree that they cannot be processed by the server, a 503 failure reply must be returned and the MMTP server must stay in the same state.

The last command in a session is preferably the QUIT command. The QUIT command may be used by a client to request that a connection be closed even if a session-opening command (MELO) has not been sent and accepted.

Reply Codes

Table I, below, lists the preferred valid reply codes that may be generated by an MMTP server. The codes are a superset of the codes returned by an SMTP server.

TABLE I

| CODE | MEANING |
| --- | --- |
| 211 | System status, or system help reply |
| 214 | Help message [useful only to human user] |
| 220 | <FQDN> Service ready |
| 221 | <FQDN> Service closing transmission channel |
| 250 | Requested mail action okay, completed |
| 251 | User not local; will forward to <forward-path> |
| 354 | Start data input; end with "." on a line by itself |
| 421 | <FQDN> Service not available, closing transmission channel [This may be a reply to any command if the server knows it must shut down] |
| 450 | Requested action not taken: mailbox unavailable |
| 451 | Requested action aborted: local error in processing |
| 452 | Requested action not taken: insufficient system storage |
| 500 | Syntax error, command unrecognized |
| 502 | Command not implemented |
| 503 | Bad sequence of commands |
| 504 | Command parameter not implemented |
| 521 | Server does not accept mail |
| 550 | Requested action not taken: mailbox unavailable |
| 551 | User not local; please try <forward-path> |
| 552 | Requested mail action aborted: exceeded storage allocation |
| 553 | Requested action not taken: mailbox name not allowed [e.g. mailbox syntax incorrect or unsupported] |
| 554 | Transaction failed |

Generally, if a MESG sequence has completed, and the MMTP server has acknowledged such completion with a positive reply code, the MMTP server accepts responsibility for the message. Correspondingly, the client relinquishes responsibility for the message.

Further, when an MMTP server returns a transient error completion status (i.e., the 400 series of reply codes) after the MESG command has completed, it should preferably not make any further attempt to deliver that message. The MMTP client retains responsibility for delivery of that message. The client preferably should be able to interpret the return of a transient or permanent failure as a non-delivery indication.

Command-Reply Sequences

Table II, below, lists the reply codes appropriate for each MMTP command. These must be strictly adhered to. Because the text part of a reply is not interpreted by the computer (i.e., the text part is present for the benefit of humans and is ignored by the computer), a receiver may alter the text, but the meaning and action implied by the code numbers themselves and by the specific command-reply sequence cannot be altered.

Each command in Table II is listed with its possible reply codes, catagorized as intermediate replies, replies indicating success, replies indicating an error, and replies indicating failure. Since some servers, under special circumstances, may generate other replies than those listed in table II, and to allow for future extension, MMTP clients should, when possible, deal with unrecognized reply codes by using the general meaning of the first digit.

Preferably, MMTP servers should not transmit reply codes that are other than three digits or that do not start in a digit between 2 and 6, inclusive.

TABLE II

| NAME | INTER-MEDIATE | SUCCESS | FAILURE | ERROR |
|---|---|---|---|---|
| CONNECTION ESTABLISHMENT | | 220 | 421, 521 | |
| MELO | | 250 | 500, 501, 504, 421 | |
| MAIL | | 250, 255 | 552, 451, 452 | 500, 501, 421 |
| CONT | 354 | 250, 255 (following code 354) | 552, 554, 451, 452 (following intermediate). 451, 554. | 500, 501, 503, 421 |
| MESG | 354 | 250,255 (following code 354) | 550, 552, 554, 451, 452 (following intermediate). 451, 554. | 500, 501, 551, 553, 421 |
| HELP | | 211, 214 | | 500, 501, 502, 504, 421 |
| NOOP | | 250 | | 500, 421 |
| QUIT | | 221 | | 500 |

Sizes and Timeouts

There are several objects in MMTP that have required minimum/maximum sizes. That is, every implementation must be able to receive objects of at least the minimum sizes, but must not send objects larger than the maximum size. Errors due to exceeding these limits may be reported using the reply codes. For example, the reply code "500 Line too long" indicates that the preceding fine contained too many characters.

Table III, below, lists the MMTP minimum/maximum sizes.

TABLE III

| | |
|---|---|
| User | The maximum length is 64 characters. |
| Domain | The maximum length is 64 characters. |
| Path | The maximum length of a reverse path or forward-path is 256 characters. |
| Command Line | The maximum length of a command line including the command word and the <CRLF> is 512 characters. |
| Reply Line | The maximum length of a reply line including the reply code and the <CRLF> is 512 characters. |
| Text Line | The maximum length of a text line including the <CRLF> is 1000 characters. |
| Message Body | There should be no built-in restriction on message-body size. If the message body data exceeds memory resources, the remainder may be bit-bucketed and a reply code of 452 or 552 returned. |
| Content | There should be no built-in restriction on content-size. If the stream of content exceeds memory resources, the remainder may be bit-bucketed and a reply code of 452 or 552 returned. |

Timeout values are control parameters related to the minimum/maximum size parameters. A timeout value specifies how long a server or client should wait for an expected response before aborting the transaction. MMTP clients should provide timeouts for all commands of at least 2 minutes. Commands which return multi-stage return codes such as CONT and MESG preferably have an independent timeout on each stage. An MMTP server preferably has a timeout of at least 5 minutes while it is awaiting the next command from the sender.

Mail Handling Strategies

Messages received by a server may be prepared for final delivery by a number of methods. MMTP itself does not mandate a specific method. However, if the received message stream is destined for another host, a number of delivery options, depending on the physical state of the network, are possible, including: (1) opening another MMTP connection to the remote host and forwarding the messages for that host as a single MMTP mail transaction, (2) opening an MMTP connection to another local MMTP-exchanger and off-loading some of the work to the local host, (3) directly opening an SMTP connection to the remote host and delivering the messages as a stream of SMTP mail transactions, or (3) placing the messages in the queue of an SMTP sender agent, such as sendmail. Alternatively, if the server receiving the message stream is the local host, the server may deliver the messages directly to user mailboxes or place the messages in the queue of a local delivery agent such as sendmail.

Mail Builds and MMTP

As briefly described above with reference to FIG. 2, some computer systems may include a client computer system that pregenerates a large number of e-mail messages for later transmission in the MMTP format, and temporarily saves the pre-generated messages as one or more files, called e-mail build files. The build file may then be forwarded to a second computer that contacts the receiving computer and sequentially transmits each line of the build file to the receiving computer. In this manner, the build file is transmitted using MMTP. The build file itself would look similar to the exemplary MMTP transaction shown in FIGS. 4 and 5A, except it would not include the server acknowledgment messages.

As described above, the present invention includes a novel method and system for efficiently delivering multiple e-mail messages to a host.

It will be apparent to those skilled in the art that various modifications and variations can be made to the present invention without departing from the scope or spirit of the invention. For example, although the content information was disclosed as referencing predefined content chunks, the content information may be allowed to reference header information. Further, although the disclosed content information referenced content chunks with a "%" symbol followed by a digit, a more user friendly symbolic form of referencing mechanism may be used. Still further, although the content information was disclosed as being the common, or redundant information in a group of e-mails, the content information may of course also be the unique, or recipient specific information. In this alternative, the protocol would end up plugging in the unique information, not the common information.

Other embodiments of the invention will be apparent to those skilled in the art from consideration of the specification and practice of the invention disclosed herein It is intended that the specification and examples be considered as exemplary only, with the true scope and spirit of the invention being indicated by the following claims.

What is claimed is:

1. A method of sending an e-mail message from a first computer to a second computer via a network, comprising the steps of:

transmitting a first portion of the e-mail message to the second computer over the network, the first portion containing at least one block of text, each block of text being assigned an index value; and transmitting a second portion of the e-mail message to the second computer over the network, the second portion addressed to a particular recipient and containing one or more pointers, each pointer pointing to one of the blocks of text using the index value for the block of text;

wherein a complete e-mail message may be created by inserting at least one block of text from the first portion into the second portion in accordance with the one or more pointers in the second portion.

2. The method of claim 1, wherein the step of transmitting a first portion includes assigning positive integers as the index values.

3. The method of claim 1, wherein the network includes the Internet.

4. The method of claim 1, wherein the transmitting steps follow the merge mail transfer protocol (MMTP).

5. The method of claim 1, wherein information received in the step of transmitting the second portion is specific to the particular recipient being addressed.

6. The method of claim 1, wherein the network is an intranet or LAN.

7. A method of receiving an e-mail message over a network from a first computer, comprising the steps of:

receiving a first portion of the e-mail message transmitted by the first computer over the network, the first portion containing at least one block of text, each block of text being assigned an index value;

receiving a second portion of the e-mail message transmitted by the first computer over the network, the second portion addressed to a particular e-mail recipient and containing one or more pointers, each pointer pointing to one of the blocks of text using the index value for the block of text; and creating a complete e-mail message by inserting at least one block of text from the first portion into the second portion in accordance with the one or more pointers in the second portion.

8. The method of claim 7, wherein the first portion includes information common to multiple e-mail messages.

9. The method of claim 7, wherein the step of receiving a first portion includes assigning positive integers as the index values.

10. The method of claim 7, wherein the network is the Internet.

11. The method of claim 7, wherein the receiving steps follow the merge mail transfer protocol MMTP).

12. The method of claim 7, wherein information received in the second portion contains information specific to the particular e-mail recipient being addressed.

13. The method of claim 7, wherein the network is an intranet or LAN.

14. A computer-readable medium containing instructions for directing a computer to implement an e-mail protocol including the steps of:

transmitting a first command initiating a first message session during which the computer transmits a first portion of an e-mail message including a common block of text; and transmitting a second command initiating a second message session during which the computer transmits a second portion of the e-mail message, the second portion including one or more pointers to the common block of text, wherein the common block of text is assigned an index value and the pointer uses this index value; and wherein a complete e-mail message may be created by inserting the common block of text from the first portion into the second portion in accordance with the one or more pointers in the second portion.

15. The method of claim 14, further including the step of transmitting a third command specifying the originator of the e-mail message.

16. The computer readable medium of claim 14, wherein the first command is a CONT command of the merge mail transfer protocol (MMTP).

17. The computer readable medium of claim 15, wherein the third command is a MAIL command of the merge mail transfer protocol (MMTP).

18. The computer readable medium of claim 14, wherein the second command is a MESG command of the merge mail transfer protocol (MMTP).

19. A computer network comprising:

a first computer system for transmitting a first portion of an e-mail message, the first portion containing at least one block of text, each of the blocks of text being assigned an index value and for transmitting a second portion of the e-mail message to the second computer over the network, the second portion addressed to a particular recipient and containing one or more pointers, each pointer pointing to one of the blocks of text using the index value for the block of text;

a second computer system for receiving the first portion and second portion and creating a complete e-mail message by inserting at least one block of text from the first portion into the second portion in accordance with the one or more pointers in the second portion.

20. A method of generating a file containing information corresponding to at least one e-mail message, the method comprising the steps of:

writing a first portion of the e-mail message to the file, the first portion containing at least one block of text and delineated within the file by a first command;

writing a second portion of the e-mail message to the file, the second portion delineated within the file by a second command, and the second portion addressed to a particular recipient and including one or more pointers to the blocks in the first portion; and wherein a complete e-mail message may be created by inserting at least one block of text from the first portion into the second portion in accordance with the one or more pointers in the second portion.

21. The method of claim 20, wherein the first command is a CONT command.

22. The method of claim 20, wherein the second command is a MESG command.

23. The method of claim 20, wherein the information written in the step of writing the second portion is specific to the particular recipient being addressed.

* * * * *

UNITED STATES PATENT AND TRADEMARK OFFICE
CERTIFICATE OF CORRECTION

PATENT NO. : 6,044,395
DATED : March 28, 2000
INVENTOR(S) : COSTALES et al.

It is certified that error appears in the above-identified patent and that said Letters Patent is hereby corrected as shown below:

Claim 11, Col. 11, line 48, change "MMTP)"

to --(MMTP)--.

Signed and Sealed this

Twenty-seventh Day of February, 2001

Attest:

NICHOLAS P. GODICI

Attesting Officer     Acting Director of the United States Patent and Trademark Office